United States Patent
Vasa et al.

(10) Patent No.: US 9,112,808 B2
(45) Date of Patent: Aug. 18, 2015

(54) DEVICES, SYSTEMS, AND METHODS FOR PROVIDING DATA

(75) Inventors: Frakash Vasa, Clarksburg, NJ (US);
Cheng-Jen Yang, Holmdel, NJ (US);
Ramaksishna Kandarpa, Manalapan, NJ (US); Kenny Huang, Green Brook, NJ (US); Siu-Hung Chu, Morganville, NJ (US); Venkatesham Nalla, Robbinsville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1928 days.

(21) Appl. No.: 11/703,010

(22) Filed: Feb. 6, 2007

(65) Prior Publication Data

US 2008/0189350 A1  Aug. 7, 2008

(51) Int. Cl.
| | | |
|---|---|---|
| *G06F 15/173* | (2006.01) | |
| *H04L 12/24* | (2006.01) | |
| *H04L 12/26* | (2006.01) | |
| *H04L 29/08* | (2006.01) | |
| *G06F 17/30* | (2006.01) | |

(52) U.S. Cl.
CPC ...... *H04L 41/5009* (2013.01); *G06F 17/30578* (2013.01); *H04L 12/2602* (2013.01); *H04L 41/5003* (2013.01); *H04L 41/5067* (2013.01); *H04L 41/5083* (2013.01); *H04L 43/00* (2013.01); *H04L 67/1008* (2013.01); *H04L 67/1012* (2013.01); *H04L 41/22* (2013.01); *H04L 43/0852* (2013.01); *H04L 43/16* (2013.01); *H04L 67/1002* (2013.01); *H04L 67/325* (2013.01)

(58) Field of Classification Search
CPC ............ H04L 41/5009; H04L 67/1008; H04L 67/1012; H04L 12/2602; H04L 41/5083; H04L 43/00; H04L 41/5003; H04L 41/5067; H04L 67/1002; H04L 67/325; H04L 43/16; H04L 43/0852; H04L 41/22; G06F 17/30578
USPC .......................................................... 709/223
See application file for complete search history.

(56) References Cited

U.S. PATENT DOCUMENTS

| | | | |
|---|---|---|---|
| 5,734,898 A | 3/1998 | He | |
| 6,336,135 B1 | 1/2002 | Niblett et al. | |
| 6,701,342 B1 * | 3/2004 | Bartz et al. | 709/200 |
| 6,886,041 B2 | 4/2005 | Messinger et al. | |
| 6,983,322 B1 * | 1/2006 | Tripp et al. | 709/225 |
| 7,143,347 B2 | 11/2006 | Su | |

(Continued)

FOREIGN PATENT DOCUMENTS

| | | |
|---|---|---|
| EP | 1657869 | 5/2006 |
| EP | 1715422 | 10/2006 |

OTHER PUBLICATIONS

Johnson, Mark. "Monitoring and Diagnosing Applications with ARM 4.0". IBM Corporation. Dec. 2004. pp. 1-13.*

(Continued)

*Primary Examiner* — John Macilwinen
(74) *Attorney, Agent, or Firm* — Akerman LLP; Michael K. Dixon; Roy P. Zachariah (57) ABSTRACT

Certain exemplary embodiments comprise a method, which can comprise, responsive to a request from a client for data services associated with an application, automatically transmitting a notification to the client indicating that a data set will be accessible asynchronously, the notification comprising an address associated with a future asynchronous transmission of the data set.

22 Claims, 3 Drawing Sheets

(56) References Cited

U.S. PATENT DOCUMENTS

| | | | |
|---|---|---|---|
| 7,269,652 B2* | 9/2007 | Chen et al. | 709/226 |
| 7,280,558 B1* | 10/2007 | Grunkemeyer et al. | 370/466 |
| 7,370,322 B1* | 5/2008 | Matena et al. | 717/171 |
| 2002/0120741 A1* | 8/2002 | Webb et al. | 709/225 |
| 2002/0174421 A1 | 11/2002 | Zhao et al. | |
| 2003/0065709 A1* | 4/2003 | Jordan et al. | 709/202 |
| 2004/0167879 A1 | 8/2004 | Cotner | |
| 2005/0125508 A1 | 6/2005 | Smith | |
| 2005/0278417 A1* | 12/2005 | Fremantle et al. | 709/203 |
| 2006/0015622 A1 | 1/2006 | Gungabeesoon | |
| 2006/0074970 A1* | 4/2006 | Narayanan et al. | 707/102 |
| 2006/0167891 A1* | 7/2006 | Blaisdell et al. | 707/10 |
| 2006/0168101 A1 | 7/2006 | Mikhailov | |
| 2006/0168199 A1* | 7/2006 | Chagoly et al. | 709/224 |
| 2006/0259911 A1 | 11/2006 | Weinrich | |
| 2007/0002825 A1 | 1/2007 | O'Brien | |
| 2008/0115135 A1* | 5/2008 | Behnen et al. | 718/101 |

OTHER PUBLICATIONS

C. Grandi. "BOSS: a tool for batch job monitoring and book-keeping" CHEP'03, San Diego, Mar. 24-28, 2003. pp. 1-4.*

* cited by examiner

DEVICES, SYSTEMS, AND METHODS FOR PROVIDING DATA

BACKGROUND

U.S. Pat. No. 6,336,135 (Niblett), which is incorporated by reference herein in its entirety, allegedly discloses, "[p]rovided is a gateway for linking between different communication models. The gateway, which may be implemented in a computer program installable on a server system, facilitates interoperation between computer programs which require synchronous communications sessions and computer programs based on an asynchronous model of communication. The invention enables a synchronously-connected client to revisit interactions with a server and asynchronously communicating programs, to interleave interactions with more than one application, and to associate together request-response pairs of a long running application. In particular, the invention provides apparatus and methods enabling linking between the Internet WWW service and a general purpose messaging system." See Abstract.

U.S. Pat. No. 6,886,041 (Messinger), which is incorporated by reference herein in its entirety, allegedly discloses, "[a]n embodiment of the invention provides an ability to configure the dispatch policy in an application or transaction server. For servlets and JSP's this is configured on a per-URL (Uniform Resource Locator) basis, RMI and EJB it is configured on a per-method basis. Available dispatch options include the ability to execute the request in the same thread that read the request or to enqueue it on a queue which feeds a pool of worker threads. Using this configuration one can control various qualities of service parameters of the requests. Requests may be expedited by executing them directly in the thread which read them, thus skipping the queue. Alternatively, some requests may be throttled by assigning them to a queue which is tended by only a limited number of threads." See Abstract.

U.S. Patent Publication No. 20020174421 (Zhao), which is incorporated by reference herein in its entirety, allegedly discloses, "[s]ystems and methods for monitoring the performance of client-server transactions from the perspective of a client. In one embodiment, a JARTA (Java Application Response Time Analyzer) component (which may include JavaScript) is installed on an end user's browser to collect various response time measurements and certain client system information and transmit this information to a server. A JARTA utility on the web server can manage the actions (e.g., insert, modify, and delete) associated with web pages that are ear-marked for JARTA testing at the client browser. The JARTA component may include a Java™ applet that can be downloaded to a client computer along with a web page. In one embodiment, a certain percentage of web transactions to be monitored can be designated using, e.g., a sampling algorithm." See Abstract.

SUMMARY

Certain exemplary embodiments comprise a method, which can comprise, responsive to a request from a client for data services associated with an application, automatically transmitting a notification to the client indicating that a data set will be accessible asynchronously, the notification comprising an address associated with a future asynchronous transmission of the data set.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments provide a method, which can comprise, responsive to a request from a client for data services associated with an application, automatically transmitting a notification to the client indicating that a data set will be accessible asynchronously, the notification comprising an address associated with a future asynchronous transmission of the data set.

Certain exemplary commercial and/or non-commercial entities can desire to provide access to information via a network to a plurality of clients. As used herein, the phrase information means facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information. As used herein, the phrase plurality means the state of being plural and/or more than one. As used herein, the phrase provide means to furnish, supply, give, convey, send, and/or make available. As used herein, the phrase related means connected to and/or associated with.

As used herein, the phrase network means a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

In certain exemplary embodiments, the information can be provided via an Enterprise Application, which can run on a server and be accessed by a client of the plurality of clients. As used herein, the phrase via means by way of and/or utilizing. As used herein, the phrase client means an information device and/or process running thereon that requests a service of another information device or process running thereon (a "server" an/or host) using some kind of protocol and accepts the server's responses. As used herein, the phrase process means (n.) an organized series of actions, changes, and/or functions adapted to bring about a result; (v.) to perform mathematical and/or logical operations according to programmed instructions in order to obtain desired information and/or to perform actions, changes, and/or functions adapted to bring about a result. As used herein, the phrase run means to execute a computer program via an information device. As used herein, the phrase server means an information device and/or a process running thereon that is adapted to be communicatively coupled to a network and that is adapted to provide at least one service for at least one other information device communicatively coupled to the network and/or for at least one process running on the other information device. A common example is a file server, which has a local disk and services requests from remote clients to read and write files on that disk. A server can also provide access to resources, such as programs, shared devices, etc. A client is part of a client-server software architecture. For example, a computer and/or process requesting the contents of a file from a file server is a client of the file server. As used herein, the phrase file means a set of data, such as related data, that is kept together. As used herein, the phrase from means used to indicate a source. As used herein, the phrase indicate means to show, mark, signal, signify, denote, evidence, evince, manifest, declare, enunciate, specify, explain, exhibit, present, reveal, disclose, and/or display. As another example, a client can download files for manipulation, monitor, run applications, and/or request application-based services, etc. As used herein, the phrase request means a query adapted to obtain information from one or more databases.

As used herein, the phrase signal means information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

As used herein, the phrase information device means any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc. As used herein, the phrase input/output (I/O) device means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

Each client of the plurality of clients can contract with commercial and/or non-commercial entities to receive access to the information in a manner that meets one or more predetermined performance standards, such as via a Service Level Agreement (SLA). As used herein, the phrase Service Level Agreement (SLA) means a written contract between a service provider and a customer that defines services provided by the service provider, one or more metrics associated with the services, acceptable and/or unacceptable service levels, liabilities on the part of the service provider and/or the customer, and/or actions to be taken in specific circumstances. As used herein, the phrase define means to establish the meaning, relationship, outline, form, and/or structure of; and/or to precisely and/or distinctly describe and/or specify. As used herein, the phrase associated with means related to. The SLA can define, for example, a maximum response time for synchronous responses to a request for information and/or a data threshold for synchronous responses to the request for information. As used herein, the phrase predetermined means established in advance. As used herein, the phrase response means a reaction to an influence and/or impetus. As used herein, the phrase time means a measurement of a point in a nonspatial continuum in which events occur in apparently irreversible succession from the past through the present to the future.

Certain exemplary embodiments can provide, responsive to a request by the client, provide a synchronous response when a processing time is less than a maximum response time, such as a maximum response time associated with an SLA of the client, and when a size of a data set is less than a data threshold, such as a data threshold associated with the SLA of the client. As used herein, the phrase data set means a collection of information acquired responsive to a query.

In certain exemplary embodiments, can dynamically change a mode of server operation by shifting from synchronous operation to asynchronous operation. As used herein, the phrase asynchronous means responsive to a request for the information, but not in hard real time as defined by a predetermined transaction timeout threshold value. As used herein, the phrase hard real time means relating to computer systems that provide an absolute deterministic response to an event. Such a response is not based on average event time. Instead, in such computer systems, the deadlines are fixed and the system must guarantee a response within a fixed and well-defined time. As used herein, the phrase system means a collection of mechanisms, devices, data, and/or instructions, the collection designed to perform one or more specific functions. Systems operating in hard real-time typically interact at a low level with physical hardware via embedded systems, and can suffer a critical failure if time constraints are violated. A classic example of a hard real-time computing system is the anti-lock brakes on a car. The hard real-time constraint, or deadline, in this system is the time in which the brakes must be released to prevent the wheel from locking. Another example is a car engine control system, in which a delayed control signal might cause engine failure or damage. Other examples of hard real-time embedded systems include medical systems such as heart pacemakers and industrial process controllers. If the processing time is determined to be greater than the maximum response time, or the size of the data set is greater than the data threshold, the data set can be redirected to another process which will transfer the data set to the client via an Extract, Transform, and Load (ETL) server.

Certain exemplary embodiments can define and/or use three different message queues: an input queue, a synchronous output queue, and an asynchronous output queue. The input queue can be adapted to store requests from users for information. The synchronous output queue can be adapted to store information responsive to the user requests that is provided synchronously to the users. The asynchronous output queue can be adapted to store information responsive to the user requests that is provided asynchronously to the users. In certain exemplary embodiments, when either the processing time exceeds the maximum response time or the size of the data set exceeds the data threshold, a notification can be sent to the client. As used herein, the phrase notification means information transmitted to advise an entity of an event, status, or condition. As used herein, the phrase transmit means to provide, furnish, supply, send as a signal, and/or to convey (e.g., force, energy, and/or information) from one place and/or thing to another.

The notification can comprise an address via which the data set can be accessed and/or an expected time when the data set can be obtained. As used herein, the phrase comprise means to include but be not limited to, what follows. As used herein, the phrase address means (n.) one or more identifiers, such as one or more symbols, characters, names, and/or numbers, used for identification in information transmission, storage, and/or retrieval, the one or more identifiers assignable to a specific physical, logical, and/or virtual machine, process, node, object, entity, record, data element, component, port, interface, location, link, route, circuit, and/or network; (v.) to locate, access, assign, and/or provide an identifier a specific physical, logical, and/or virtual machine, process, node, object, entity, record, data element, component, port, interface, location, link, route, circuit, and/or network. The client can respond to the notification and can request an asynchronous transmission of the data set. As used herein, the phrase asynchronous transmission means a communication responsive to a request for the information, but not in hard real time as defined by a predetermined transaction timeout threshold value. The data set can be redirected to the asynchronous output queue and transmitted asynchronously to the client.

In certain exemplary embodiments, a dynamic transaction mode can be defined as a library that a software developer can use. Performance of data set acquisition and transmission can be monitored and/or statistics related thereto can be calculated. Developers of existing applications and/or new application can access the library. In order to access the library, certain exemplary applications can configure a web server and/or set one or more parameters in a configuration file.

Certain exemplary embodiments can provide a service request/response transaction mode that can be capable of handling different data sizes and/or response times. The transaction mode can be applied to provide data services to interfacing Enterprise Applications using Web Services to attempt to eliminate indefinite delays in response time. As used herein, the phrase data services means software adapted to manage a data collection obtained via query from one or more databases, such management potentially including correlating, merging, formatting, transforming, and/or reporting any portion of the data collection. As used herein, the phrase query means (n) a request, such as for information from a database. (v) to request and/or obtain information, such as from a database in response to a structured request. Certain exemplary embodiments comprise an evaluation of end-to-end data flow, transaction statistics, error analysis, and/or reporting capability optimization, etc.

Transmitting data sets responsive to client requests as synchronous transactions might cause undue delays in waiting for a response when a data set size is large, a request processing time is long, and/or an unexpected error condition is encountered. In certain exemplary embodiments, transmitting data sets using asynchronous transactions might cause undue complexity when dealing with short bursty traffic patterns.

Certain exemplary embodiments can provide a data service mechanism that handles traffic patterns relatively effectively without undue processing delays or software complexity. Certain exemplary embodiments can deploy a combination of synchronous and asynchronous transaction mechanisms. Two parameters can be associated with an exemplary dynamic transaction: a transaction timeout threshold value (TT) and a data set size threshold value (DT). The two parameters can be specified as part of a transaction and/or in an agreement, such as an interface agreement and/or a service level agreement. In certain exemplary embodiments values of TT and/or DT can be any value. For example, TT can be specified as approximately, in seconds, 0.05, 0.8, 1.02, 2.9, 3, 4.7, 5.34, 10.1, 15.6, 40, 53.23, 60, 85.11, 99.7, 150, 567.1, 3600, and/or any value or subrange therebetween, etc. For example, DT can be specified as, in megabytes, 0.1, 0.954, 1.27, 3, 6.1, 10, 15.2, 45.7, 150, 200, 220.6, 350, 500, 1,000, 1,249.7, 2,000, and/or any value or subrange therebetween, etc.

In certain exemplary embodiments, a request initiation can behave as a synchronous transaction. Upon receiving the request, a server can set a timer based TT. If the server completes the request prior to the timer expiration and the resulting data set size is smaller than DT, the requesting data can be returned as a normal synchronous response and hence introduce relatively little overhead for this type of transaction. However, if the resulting data size is greater than DT or the timer expires, a token or acknowledgement can be returned to the client as part of the transaction. The resulting data can either be sent back to the client via a bulk transfer mode or retrieved by the client at a later time determined by the client. In the case of timer expiration, a separate thread on the server can continue with processing the request. Once the processing is complete, the thread can check for timer expiration status and return the result accordingly. In certain exemplary embodiments, assembly of the data set can involve obtaining and/or requesting data from a plurality of databases. The plurality of databases can be any number of data bases, such as, for example, 1, 2, 5, 7, 14, 20, 29, 30, 40, 55, 100, 1000, and/or any value or subrange therebetween, etc. Prior to transmission to the client, the data set can be acquired, assembled, merged, examined, corrected for errors, translated, and/or formatted, etc.

Certain exemplary embodiments can attempt to eliminate unnecessary response delays from the client's perspective in case of short response time and small data size. Certain exemplary embodiments can provide one or more data transfer mechanisms based on data size. Upon receiving the notification from the server the client can proceed with performing other tasks while waiting for the data set to be provided via the asynchronous queue. Certain exemplary embodiments can be adapted to monitor performance and/or determine collection of statistical values related to the transmission. Certain exemplary embodiments can function as an automated module or as a part of end-to-end high availability computing infrastructure. Certain exemplary embodiments can determine, receive, and/or record a beginning time of a request. Certain exemplary embodiments can send an error response upon timeout and/or exceeding data volume threshold. Certain exemplary embodiments can capture statistics. Certain exemplary embodiments can utilize a vender independent mechanism, which can be used with a J2EE technology.

Certain exemplary embodiments can be built as a library, which a software developer can use. Debugging techniques and/or knowledge can be accumulated relatively rapidly utilizing such embodiments. Developers of existing applications and/or new application can plug into an exemplary library. Developers can configure a server, set one or more parameters in a configuration file, and/or develop business logic.

Figure 1:
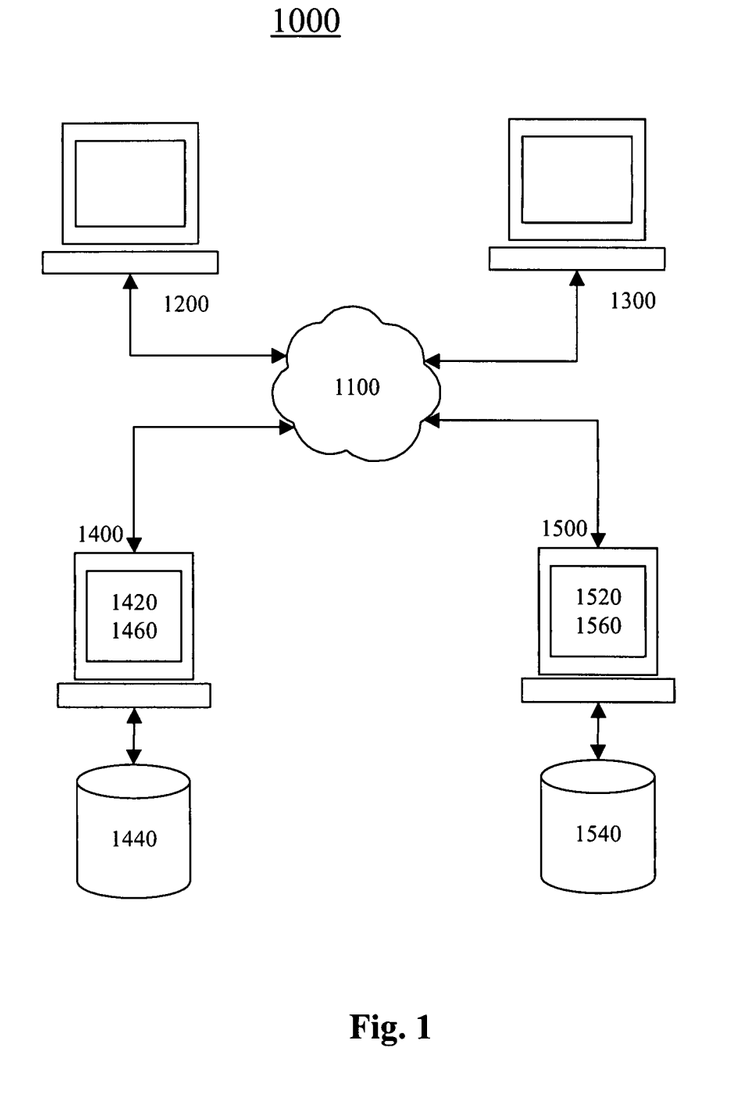
FIG. 1 is a block diagram of an exemplary embodiment of a system 1000.

FIG. 1 is a block diagram of an exemplary embodiment of a system 1000, which can comprise a network 1100, a first server 1400, and a second server 1500. First server 1400 and/or second server 1500 can be adapted to provide services, such as Web-based services, to a plurality of clients and/or client devices, such as a first information device 1200 and/or a second information device 1300. As used herein, the phrase adapted to means suitable, fit, and/or capable of performing a specified function. As used herein, the phrase perform means to begin, take action, do, fulfill, accomplish, carry out, and/or complete, such as in accordance with one or more criterion. As used herein, the phrase Web-based means accessible via the Internet. As used herein, the phrase accessible means available to be obtained. As used herein, the phrase available means adapted to be accessed.

As used herein, the phrase user interface means a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, (etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

First server 1400 can comprise a user program 1420 and a user interface 1460. First server 1400 can be an application server, such as a Web Applications Server, adapted to provide application access to a user program 1420, which can be an Enterprise Application. As used herein, the phrase Enterprise Application means a software application that performs business functions such as accounting, customer information tracking, and the like, hosted on an application server that concurrently provides services to a plurality of users via a network. As used herein, the phrase Web Application Server means hardware, firmware, and/or software communicatively coupled to the World Wide Web (connected via the Internet Backbone) and adapted to run executable machine instructions that can be accessed via an information device communicatively coupled to the World Wide Web. In certain exemplary embodiments, an application server can be a component-based product that resides in the middle-tier of a server centric architecture. The application server can provide middleware services for security and state maintenance, along with data access and persistence. Java application servers can be based on the Java™ 2 Platform, Enterprise Edition (J2EE™). J2EE can use a multi-tier distributed model, which generally can include a Client Tier, a Middle Tier, and/or an EIS Tier. The Client Tier can be one or more applications or browsers. The J2EE Platform can be in a Middle Tier and comprise a Web Server and/or an EJB Server, which can also be called "containers". There can be additional sub-tiers in the middle tier. The Enterprise Information System (EIS) tier can utilize and/or serve the existing applications, files, and databases. For the storage of business data, the J2EE platform can require a database that is accessible through the Java Database Connectivity (JDBC), Structured Query Language embedded in Java (SQLJ), and/or Java Data Objects (JDO) Application Program Interface (API). The database can be accessible from web components, enterprise beans, and/or application client components.

User interface 1460 can be adapted to render information regarding one or more client requests for information. As used herein, the phrase regarding means pertaining to. As used herein, the phrase render means to display, annunciate, speak, print, and/or otherwise make perceptible to a human, for example as data, commands, text, graphics, audio, video, animation, and/or hyperlinks, etc., such as via any visual, audio, and/or haptic means, such as via a display, monitor, printer, electric paper, ocular implant, cochlear implant, speaker, etc. First server 1400 can comprise a memory device 1440, which can be adapted to store one or more databases. As used herein, the phrase database means one or more structured sets of persistent data, usually associated with software to update and query the data. A simple database might be a single electronic file containing many records, each of which is structured using the same set of fields. As used herein, the phrase each means every one of a group considered individually. As used herein, the phrase store means to place, hold, retain, enter, and/or copy into and/or onto a machine-readable medium.

First server 1400 can be adapted to receive a request for information from a client, such as first information device 1200. As used herein, the phrase receiving means obtaining, taking, and/or acquiring. The client can specify and/or be associated with a data set size threshold value and/or a transaction timeout threshold value. As used herein, the phrase data set size threshold value means a metric indicative of a predetermined maximum extent of a block of information transmittable via a synchronous transmission. As used herein, the phrase synchronous transmission means a communication that occurs responsive to a request for the information in hard real time as defined by a predetermined transaction timeout threshold value.

First server 1400 can be adapted to respond to the request synchronously if a data set associated with the request is smaller than the data set threshold value and/or the data set can be acquired and/or transmitted in a time interval that is less than the transaction timeout threshold value. As used herein, the phrase acquire means to obtain and/or gain possession of. As used herein, the phrase less than means having a measurably smaller magnitude and/or degree as compared to something else. In event that the data set associated with the request is greater than the data set threshold value and/or the data set is not acquired and/or transmitted in a time interval that is less than the transaction timeout threshold value, the request can be responded to asynchronously by second server 1500, which can be an Extract-Transform-Load (ETL) server. As used herein, the phrase Extract-Transform-Load (ETL) Server means hardware, firmware, and/or software adapted to provide clients with data via a process that can comprise extracting data from one or more databases responsive to a query, transforming the extracted data into a predetermined format, and/or loading data into a predetermined memory for later retrieval. As used herein, the phrase greater means larger in magnitude. As used herein, the phrase into means to a condition, state, or form of. In certain exemplary embodiments, first information device 1200 can be notified regarding the asynchronous response by first server 1400 and/or second server 1500.

As used herein, the phrase processor means a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

First server 1400 can comprise a processor adapted to, responsive to a request from a client for Web-based data services associated with an Enterprise Application, if a size of a data set acquired responsive to the request is greater than or equal to a predetermined data set size threshold value or if a Web server does not acquire and transmit the data set to the client prior to a transaction timer exceeding a predetermined transaction timeout threshold value, automatically transmit a notification to the client indicating that the data set will be accessible asynchronously. As used herein, the phrase automatically means acting and/or operating in a manner essentially independent of external human influence and/or control. For example, an automatic light switch can turn on upon "seeing" a person in its view, without the person manually operating the light switch. As used herein, the phrase equal means substantially the same as. As used herein, the phrase exceeding means greater than. As used herein, the phrase prior means before in time. As used herein, the phrase transaction timer means a system adapted to measure an elapsed time between a first event and a second event. As used herein, the phrase transaction timeout threshold value means a metric indicative of a predetermined maximum time interval for acquiring and transmitting a data set.

The notification can comprise an address associated with a future asynchronous transmission of the data set. The address can be based upon a correlation identifier. As used herein, the phrase correlation identifier means a moniker adapted to distinguish a transaction from other transactions and/or adapted to associate a plurality of activities with the transaction. The data set can be transmitted to second server 1500, which can be associated with the address. As used herein, the phrase based upon means determined in consideration of and/or derived from. As used herein, the phrase determine means to find out or come to a decision about by investigation, reasoning, or calculation. The Enterprise Application can be running on first server 1400.

Second server 1500 can comprise a user program 1520 and a user interface 1560. User program 1520 can be adapted to receive a request for asynchronously provided information to first information device 1200. User program 1520 can be adapted to acquire, transform, format, merge, load, and/or store information related to the request for asynchronous transmission to first information device 1200.

In certain exemplary embodiments, user program 1420 and/or user program 1520 can be implemented using Web Logic Java Application Server and/or Java 2 Platform Enterprise Edition (J2EE) technologies, such as Web Services, Enterprise Java Beans (EJB), Java Messaging Service (JMS), eXtensible Markup Language (XML), Business Processes, and/or Java, etc. In certain exemplary embodiments, user program 1420 and/or user program 1520 can be implemented as web services, which can conform to a service oriented architecture. Authentication and/or authorization of the client can be implemented using user program 1420, which can confirm the identity of the client to a J2EE security method. JMS can be used for queuing the request and/or responses in an input queue, a synchronous output queue, and/or an asynchronous output queue. User program 1420 and/or user program 1520 can utilize one or more J2EE component technologies such as EJB, Java Database Connectivity (JDBC), and/or Hyper Text Transfer Protocol (HTTP), etc., to process the request and/or associated subrequests to collect and/or aggregate the data set since databases accessed to acquire the data set can be distributed in nature. As used herein, the phrase subrequest means a divisible portion of a request. The data set can be formatted via user program 1420 and/or user program 1520 utilizing XML.

In certain exemplary embodiments, user program 1420 and/or user program 1520 can be implemented using C/C++, Common Object Request Broker Architecture (CORBA), a Transmission Control Protocol/Internet Protocol (TCP/IP) based distributed client/server mechanism, and/or MQ Series (i.e., a network communication technology developed by IBM, of Armonk, N.Y., adapted to allow independent and/or potentially non-concurrent applications on a distributed system to communicate with each other), and/or other messaging middleware, etc.

Events can be logged by user program 1420 and/or user program 1520. The events can comprise: entry of request information into the input queue, retrieval of the request from the input queue, transmission of the request information to a request processor, transmission of request processor sends information to an aggregator, transmission of information from the aggregator to an access layer component (multiple access instances can be invoked), a request to a back end systems and/or database by the access layer component, a receipt of data set information by the access layer component from the back end system and/or database (multiple log entries of data set information transmittal from back end systems and/or databases can be entered for a given request depending upon a nature of the request), receipt of a response data by the aggregator from the access layer component, receipt of an aggregated response by the request processor from the aggregator, an entry of the data set into a synchronous output queue or asynchronous output queue by the request processor, transmission of a response to the client, transmission of a synchronous response and/or timeout message (i.e. when a response to a request is provided via an asynchronous request), failure of a security check, detection of an error and/or transmission of an error message to the client, and/or transmission and/or receipt of a notification to the client (which can comprise a notification that a data set is available for the client to retrieve, etc. As used herein, the phrase security check means a verification of an identity of a user, user device, and/or other entity. As used herein, the phrase synchronous response time value means a time interval indicative of a time delay between receiving a request for synchronously transmitted data and providing the synchronously transmitted data to a client.

In certain exemplary embodiments, first information device 1200 can request a data set related to a Customer Relationship Management (CRM) application. For example, a sales team might desire information related to one or more business cases associated with negotiating and/or establishing a contract with a customer. The sales team might desire a relatively large data set that comprises customer and/or inventory data. As another example, an ordering entity might desire to configure, reconfigure, change, and/or delete customer services. Certain exemplary embodiments can assemble customer and/or inventory data by location and/or cross location for single or multiple customer contacts. As used herein, the phrase assemble means to obtain portions and create a whole from the portions. As used herein, the phrase create means to make, form, produce, generate, bring into being, and/or cause to exist. Certain exemplary embodiments can be utilized in providing on-demand television services such that screen freezes can be avoided and/or reduced in count and/or duration. In such applications a user can browse channels while the data set is downloaded from a server associated with the on-demand television services.

Figure 2:
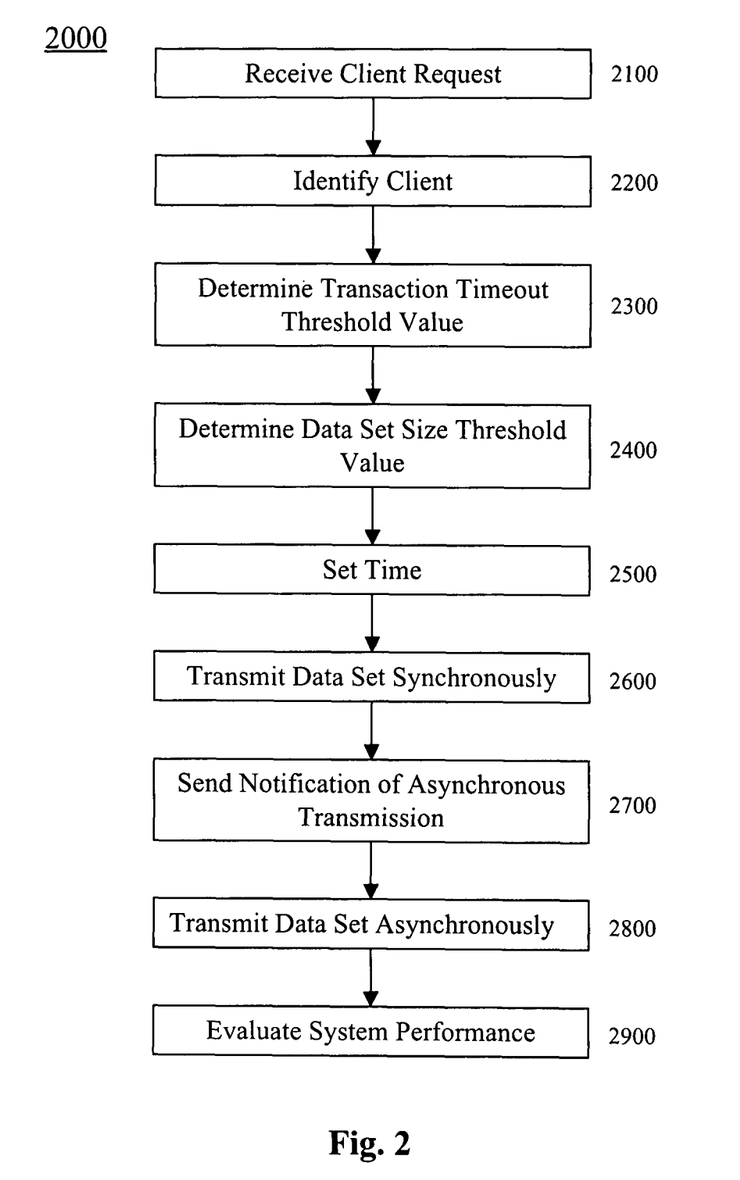
FIG. 2 is a flowchart of an exemplary embodiment of a method 2000.

FIG. 2 is a flowchart of an exemplary embodiment of a method 2000. As used herein, the phrase activity means an action, act, deed, function, step, and/or process and/or a portion thereof. As used herein, the phrase method means a process, procedure, and/or collection of related activities for accomplishing something. At activity 2100, a client request can be received. The request can be for data services, such as Web-based data services, associated with an application, such as an Enterprise Application. The application can be running on a server, such as a Web Application Server. The request can comprise client credentials and/or a specification of data set size threshold and/or a transaction timeout threshold value. The request can comprise an account identifier, which can be associated with information requested for retrieval by the request. For example, a telecommunications customer can request account activity information and/or billing records associated with the account identifier. In certain exemplary embodiments, Service Level Agreement information related to a client can be requested and/or received responsive to the request. In certain exemplary embodiments a log can be created and/or a log event recorded responsive to receiving the request.

At activity 2200, the client can be identified. As used herein, the phrase identify means to specify, recognize, detect, and/or establish the identity, origin, nature, and/or definitive characteristics of. In certain exemplary embodiments, a security check can be performed regarding the request. The security check car be adapted to identify the client. An error message can be returned to the client and/or a management entity responsive to a determination that the security check failed. As used herein, the phrase management entity means a person and/or information device adapted to handle, supervise, control, direct, and/or govern activities associated with a machine. Certain exemplary embodiments can determine that the Service Level Agreement information applies to the client. As used herein, the phrase applies means is pertinent and/or relevant to.

At activity 2300, a transaction timeout threshold value can be obtained, defined, and/or determined. The transaction timeout threshold value can be associated with the client. The transaction timeout threshold value can be obtained from the client, the Service Level Agreement, and/or from other client information. The transaction timeout threshold value can be selected from a plurality of potential transaction timeout threshold values based upon one or more criteria.

At activity 2400, a data set size threshold value can be defined, obtained, and/or determined. The data set size threshold value can be associated with the client. The data set size threshold value can be obtained from the client, the Service Level Agreement, and/or from other client information. The data set size threshold value can be selected form a plurality of potential data set size threshold values based upon one or more criteria.

At activity 2500, a timer can be set indicative of a time in acquiring and/or transmitting the data set. The timer can be a transaction timer initiated responsive to the request. As used herein, the phrase initiate means to begin. In certain exemplary embodiments a callback profile for the client can be created that comprises client address information. As used herein, the phrase callback profile means information identifying a client and/or establishing a location at which client communications can be provided. In certain exemplary embodiments, the client address information can comprise at least one of a Web Services Description Language (WSDL) Uniform Resource Locator (URL), machine name, directory for file transfer, and a web URL (such as a Web URL for an XML/HTTP interface). As used herein, the phrase at least means not less than. As used herein, the phrase directory means a listing of files stored in a memory device. As used herein, the phrase machine name means a sequence of one or more characters that uniquely identifies an information device. As used herein, the phrase transfer means (n) a transmission from one device, place, and/or state to another. (v) to convey from one device, place, and/or state to another. As used herein, the phrase uniform resource locator (URL) means an address that specifies a location of a file. As used herein, the phrase Web Services Description Language (WSDL) means an XML based language adapted to describe network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate.

Certain exemplary embodiments can create a correlation identifier associated with the request. An output file name can be created and/or associated with the correlation identifier. A wrapper request can be created which comprises a request payload, the correlation identifier, the transaction timeout threshold value, the data set size threshold value, the output file name, and/or location information for writing the data set to an output queue. The location information can be provided to the client to obtain the data set from an asynchronous queue and/or ETL server. As used herein, the phrase asynchronous queue means a memory adapted for use in transmitting information to a client responsive to a request for the information, but not in hard real time as defined by a predetermined transaction timeout threshold value. The request can be written in a queue, which can comprise a plurality of requests. Requests can be acted upon in an order received based upon a time and/or order of placement in the queue. Certain exemplary embodiments can validate the request. As used herein, the phrase validate means to corroborate and/or establish the validity and/or soundness of. Certain exemplary embodiments can analyze the request. As used herein, the phrase analyze means to review, study, examine, evaluate, and/or consider in detail and/or to subject to an analysis in order to discover essential features and/or meaning. Certain exemplary requests can be predetermined asynchronous requests which can be provided to an Extract-Transform-Load (ETL) server. A response can be provided to the client that comprises the correlation identifier. The response can indicate to a user that the request has been provided to the ETL server and that the ETL server will provide the data set at a later time. The later time can be estimated and/or provided to the client after the data set is acquired, formatted, and ready for transmission to the client.

The request can be picked from the queue to be processed. Certain exemplary embodiments can divide the request into a plurality of subrequests. As used herein, the phrase divide means to separate into parts. Each subrequest can be adapted to be processed by a distinct database server from a plurality of database servers. As used herein, the phrase database server means hardware, firmware, and/or software adapted to provide query-responsive data retrieval services to a plurality of clients. As used herein, the phrase distinct means discrete and/or readily distinguishable from all others. The plurality of subrequests can be adapted to be processed by the plurality of database servers in parallel. As used herein, the phrase parallel means a simultaneous performance of multiple operations. Certain exemplary embodiments can acquire the data set responsive to the request. The data set can be assembled from responses provided by the plurality of database servers.

At activity 2600, the data set can be transmitted synchronously. In certain exemplary embodiments, if a size of the data set is less than the data set size threshold value and if a server acquires and transmits the data set to the client prior to the transaction timer exceeding the transaction timeout threshold value, the data set can be synchronously transmitted to the client via a synchronous queue. As used herein, the phrase synchronous queue means a memory adapted for use in transmitting information to a client responsive to a request for the information in hard real time as defined by a predetermined transaction timeout threshold value. An event can be logged indicative of the transmission of the data set to the synchronous queue.

At activity 2700, a notification of an asynchronous transmission can be sent. In certain exemplary embodiments, if the size of the data set is greater than or equal to the data set size threshold value or if the server does not acquire and transmit the data set to the client prior to the transaction timer exceeding the transaction timeout threshold value, a notification can be transmitted to the client indicating that the data set will be accessible asynchronously. As used herein, the phrase does not means never attempts to or fails to. The notification can comprise an address associated with a future asynchronous transmission of the data set. The address can be based upon the correlation identifier. In certain exemplary embodiments a log can be created and/or a log event recorded indicating that the data set is greater than or equal to the data set size threshold value and/or the server not acquiring and transmitting the data set to the client prior to the transaction timer exceeding the transaction timeout threshold value.

In certain exemplary embodiments, responsive to a request from a client for Web-based data services associated with an Enterprise Application, if a size of a data set acquired responsive to the request is greater than or equal to a predetermined data set size threshold value or if a Web server does not acquire and transmit the data set to the client prior to a transaction timer exceeding a predetermined transaction timeout threshold value, a notification can be automatically transmitted to the client indicating that the data set will be accessible asynchronously. The data set can be acquired by and/or transmitted to the ETL server associated with the address. The data set can be provided with additional information, which can comprise the correlation identifier, the output file name, and/or location information related to the asynchronous queue, etc. The data set can be placed in an asynchronous queue for subsequent transmission to the client. An event can be logged indicative of the transmission and/or placement of the data set to the synchronous queue. The Enterprise Application can be running on the Web server.

At activity 2800, the data set can be transmitted asynchronously. The data set can be transmitted to an asynchronous queue on the ETL server. At the ETL server, a response can be received from the client to the notification. The response can comprise an identification of the data set. The client can retrieve the notification and can provide the address and/or callback information in a response adapted to obtain the data set from the ETL server. The data set can be transmitted from the ETL server to the client. If no callback profile is available for the client, the data set can be stored in the directory for file transfer. An event can be logged indicative of the transmittal of the data set to the client and/or storage of the data set in the directory for file transfer.

At activity 2900, system performance can be evaluated. In certain exemplary embodiments, an acquisition time value associated with acquiring the data set can be determined. A synchronous response time value can be determined if the data set is synchronously transmitted. An asynchronous response time value can be determining if the data set is asynchronously transmitted. As used herein, the phrase asynchronous response time value means a time interval indicative of a time delay between receiving a request for asynchronously transmitted data and completing preparation of and/or providing the asynchronously transmitted data. A performance metric associated with requests for data sets can be determined. As used herein, the phrase performance metric means a measured and/or determined value of a variable related to conducting an activity. The performance metric can be related to at least one of the acquisition time value, the synchronous response time value, and/or the asynchronous response time value. The performance metric can comprise a count, response time percentile, maximum duration for a largest data set acquired, a percentage of client requests successfully responded to, a percentage of client requests returning no data, a percentage of client requests that exceeded the transaction timeout threshold value, and/or a percentage of errors encountered in fulfilling client requests, etc. As used herein, the phrase percent means one part in one hundred.

Availability of a server can be measured via the performance metric. As used herein, the phrase availability means a portion of a time period that a predetermined service was or will be functional. The availability of the server can be a percentage of a desired time period during which the server serviced client requests and/or could have serviced client requests had the client requests been made. Certain exemplary embodiments can be adapted to achieve a level of the availability of at least 95, 99, 99.9, 99.99, 99.999, 99.9995, 99.9998, and/or 99.9999 percent for the Enterprise Application. As used herein, the phrase achieve means to attain with effort. Certain exemplary embodiments can automatically compare the performance metric to the Service Level Agreement information. As used herein, the phrase compare means to examine in order to note similarities or differences between at least two items. A report can be prepared, rendered, and/or provided to a management entity. As used herein, the phrase report means to provide information, often in a predetermined format. The report can indicate compliance of the performance metric to the Service Level Agreement information. As used herein, the phrase compliance means the act of complying with a specification or demand.

Figure 3:
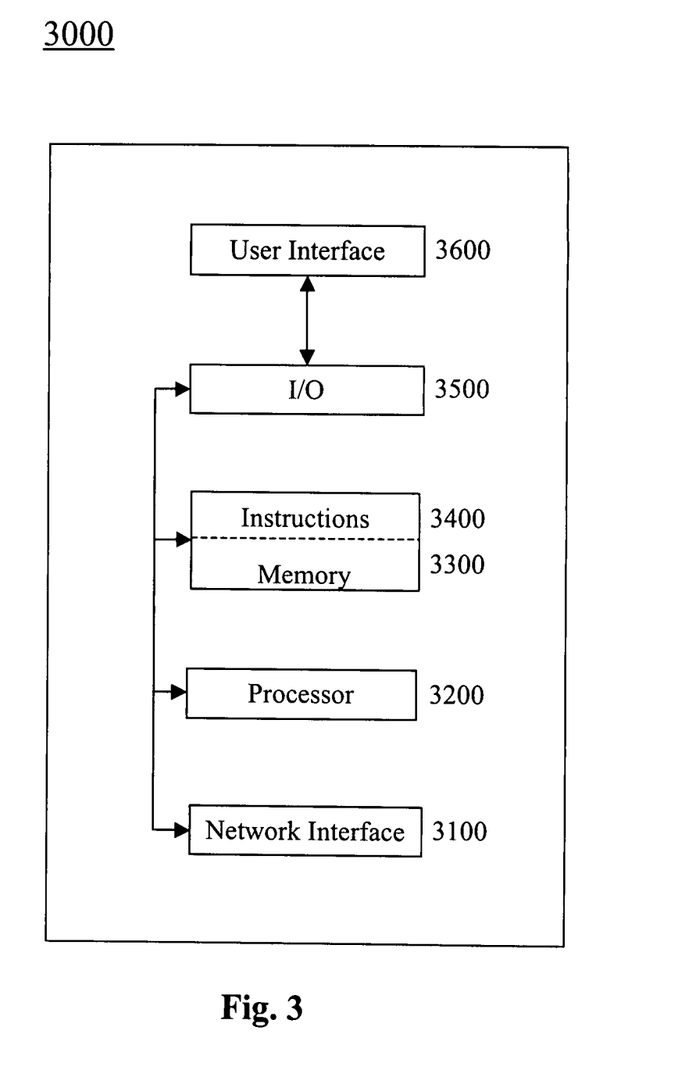
FIG. 3 is a block diagram of an exemplary embodiment of an information device 3000.

FIG. 3 is a block diagram of an exemplary embodiment of an information device 3000, which in certain operative embodiments can comprise, for example, first information device 1200, second information device 1300, first server 1400, and second server 1500 of FIG. 1. Information device 3000 can comprise any of numerous components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc. Processor 4200 can be adapted to execute machine instructions. As used herein, the phrase machine instructions means directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

Memory 3300 can be a memory device and/or a machine-readable medium. As used herein, the phrase machine-readable medium means a physical structure from which a machine, such as an information device, computer, microprocessor, and/or controller, etc., can obtain and/or store data, information, and/or instructions. Examples include memories, punch cards, and/or optically-readable forms, etc. As used herein, the phrase memory device means an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

In certain exemplary embodiments, via one or more user interfaces 3600, such as a graphical user interface, a user can view a rendering of information related to providing information to a client responsive to a request for server data services.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

- there is no requirement for the inclusion of any particular described or illustrated characteristic, function, activity, or element, any particular sequence of activities, or any particular interrelationship of elements;
- any elements can be integrated, segregated, and/or duplicated;
- any activity can be repeated, performed by multiple entities, and/or performed in multiple jurisdictions; and
- any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When terms are defined substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A method of responding to a request for a web-based data service, comprising:
receiving service level agreement information related to a client;
receiving the request for the web-based data service associated with an enterprise application from the client, wherein the enterprise application executes on a web application server;
performing a security check regarding the request, wherein the security check identifies the client;
determining that the service level agreement information applies to the client;
defining a transaction timeout threshold value associated with the client;
defining a data set size threshold value associated with the client;
creating a correlation identifier associated with the request;
initiating a transaction timer in response to the request;
acquiring a data set in response to the request;
if the size of the data set is greater than or equal to the data set size threshold value and if the data set is not acquired and transmitted to the client by the server prior to the transaction timer exceeding the transaction timeout threshold value:
transmitting a notification to the client indicating that the data set will be accessible asynchronously, wherein the notification is transmitted by utilizing instructions stored in memory and executed by a processor, wherein the notification comprises an address associated with a future asynchronous transmission of the data set, and wherein the address is based upon the correlation identifier;
transmitting the data set to an asynchronous queue on an extract-transform-load server;
receiving a response from the client to the notification at the extract-transform-load server, wherein the response comprises an identification of the data set;
transmitting the data set from the extract-transform-load server to the client;
storing the data set in a directory for file transfer if no callback profile is available for the client;
determining an acquisition time value associated with acquiring the data set;
determining an asynchronous response time value if the data set is asynchronously transmitted;
determining a performance metric associated with acquiring the data set wherein the performance metric is related to the acquisition time value and the asynchronous response time value;
comparing the performance metric to the service legal agreement information; and
reporting compliance of the performance metric with the service level agreement information.

2. A method of responding to a request for a web-based data service, comprising:
receiving the request from a client for the web-based data service associated with an enterprise application, wherein the enterprise application is based on JAVA 2 PLATFORM ENTERPRISE EDITION and accesses a database server via a java database connectivity application program interface;
transmitting a notification to the client indicating that a data set will be accessible asynchronously if a size of the data set acquired in response to the request is greater than or equal to a predetermined data set size threshold value and if the data set is not acquired and transmitted to the client by a web server prior to a transaction timer exceeding a predetermined transaction timeout threshold value,
wherein the notification is transmitted by utilizing instructions stored in memory and executed by a processor,
wherein the notification comprises an address associated with a future asynchronous transmission of the data set,
wherein the address is based upon a correlation identifier sent with the notification,
wherein the correlation identifier distinguishes a transaction associated with acquiring the data set from other transactions and associates a plurality of activities with the transaction associated with acquiring the data set,
wherein the data set is transmitted to an extract-transform-load server associated with the address, and
wherein the enterprise application executes on the web server; and
storing the data set in a directory for file transfer if no callback profile is available for the client.

3. The method of claim 2, further comprising:
receiving a request for a plurality of other web-based data services.

4. The method of claim 2, further comprising:
performing a security check regarding the request, the security check adapted to identify the client.

5. The method of claim 2, further comprising:
receiving service level agreement information related to the client.

6. The method of claim 2, further comprising:
receiving service level agreement information related to the client;
determining that the service level agreement information applies to the client; and
automatically comparing a performance metric associated with the request to the service level agreement information.

7. The method of claim 2, further comprising:
receiving service level agreement information related to the client;
determining that the service level agreement information applies to the client;
determining a performance metric associated with requests for data sets, wherein the performance metric defines an availability of the enterprise application to clients; and
automatically comparing the performance metric associated with the request to the service level agreement information.

8. The method of claim 2, further comprising:
defining the transaction timeout threshold value.
9. The method of claim 2, further comprising:
defining the data set size threshold value.
10. The method of claim 2, further comprising:
creating the callback profile for the client that comprises client address information, wherein the client address information comprises a web services description language uniform resource locator, machine name, directory for file transfer, or a web uniform resource locator.
11. The method of claim 2, further comprising:
creating the correlation identifier.
12. The method of claim 2, further comprising:
initiating the transaction timer responsive to the request.
13. The method of claim 2, further comprising:
validating the request.
14. The method of claim 2, further comprising:
automatically reporting, to a management entity, compliance of a response to the request to client service level agreement information.
15. The method of claim 2, further comprising:
synchronously transmitting the data set to the client via a synchronous queue if the size of the data set is less than the data set size threshold value and if the web server acquires and transmits the data set to the client prior to the transaction timer exceeding the transaction timeout threshold value.
16. The method of claim 2, further comprising:
transmitting the data set to an asynchronous queue on the extract-transform-load server.
17. The method of claim 2, further comprising:
receiving a response from the client to the notification at the extract-transform-load server, wherein the response comprises an identification of the data set.
18. The method of claim 2, further comprising:
transmitting the data set to an asynchronous queue on the extract-transform-load server.
19. The method of claim 2, further comprising:
transmitting the data set to an asynchronous queue on the extract-transform-load server.
20. The method of claim 2, further comprising:
achieving a level of availability of at least 99.9998 percent for the enterprise application.
21. A system for responding to a request for a web-based data service, comprising:
a memory that stores instructions;
a processor that executes the instructions to perform operations comprising:
receiving the request from a client for the web-based data service associated with an enterprise application, wherein the enterprise application is based on JAVA 2 PLATFORM ENTERPRISE EDITION and accesses a database server via a java database connectivity application program interface;
transmitting a notification to the client indicating that a data set will be accessible asynchronously if a size of the data set acquired in response to the request is greater than or equal to a predetermined data set size threshold value and if the data set is not acquired and transmitted to the client by a web server prior to a transaction timer exceeding a predetermined transaction timeout threshold value,
wherein the notification is transmitted by utilizing instructions stored in memory and executed by a processor,
wherein the notification comprises an address associated with a future asynchronous transmission of the data set,
wherein the address is based upon a correlation identifier sent with the notification,
wherein the correlation identifier distinguishes a transaction associated with acquiring the data set from other transactions and associates a plurality of activities with the transaction associated with acquiring the data set,
wherein the data set is transmitted to an extract-transform-load server associated with the address, and
wherein the enterprise application executes on the web server; and
storing the data set in a directory for file transfer if no callback profile is available for the client.
22. A machine-readable storage device comprising machine instructions, the instructions executable by a processor to cause the processor to perform operations comprising:
receiving the request from a client for the web-based data service associated with an enterprise application, wherein the enterprise application is based on JAVA 2 PLATFORM ENTERPRISE EDITION and accesses a database server via a java database connectivity application program interface;
transmitting a notification to the client indicating that a data set will be accessible asynchronously if a size of the data set acquired in response to the request is greater than or equal to a predetermined data set size threshold value and if the data set is not acquired and transmitted to the client by a web server prior to a transaction timer exceeding a predetermined transaction timeout threshold value,
wherein the notification is transmitted by utilizing instructions stored in memory and executed by a processor,
wherein the notification comprises an address associated with a future asynchronous transmission of the data set,
wherein the address is based upon a correlation identifier sent with the notification,
wherein the correlation identifier distinguishes a transaction associated with acquiring the data set from other transactions and associates a plurality of activities with the transaction associated with acquiring the data set,
wherein the data set is transmitted to an extract-transform-load server associated with the address, and
wherein the enterprise application executes on the web server; and
storing the data set in a directory for file transfer if no callback profile is available for the client.

* * * * *

UNITED STATES PATENT AND TRADEMARK OFFICE
CERTIFICATE OF CORRECTION

| | | |
|---|---|---|
| PATENT NO. | : 9,112,808 B2 | Page 1 of 1 |
| APPLICATION NO. | : 11/703010 | |
| DATED | : August 18, 2015 | |
| INVENTOR(S) | : Vasa et al. | |

It is certified that error appears in the above-identified patent and that said Letters Patent is hereby corrected as shown below:

Title Page

The first inventor's name as currently stated on the patent on page 1, Item 75 is:

"Frakash Vasa"

Please correct the first inventor's name to read as:

--Prakash Vasa--

The third inventor's name as currently stated on the patent on page 1, Item 75 is:

"Ramaksishna Kandarpa"

Please correct the third inventor's name to read as:

--Ramakrishna Kandarpa--

Signed and Sealed this
Twenty-second Day of December, 2015

Michelle K. Lee
*Director of the United States Patent and Trademark Office*